Sept. 8, 1931. F. H. OWENS 1,822,057
METHOD FOR RECORDING PHOTOGRAPHIC SOUND RECORDS
Filed Sept. 17, 1928
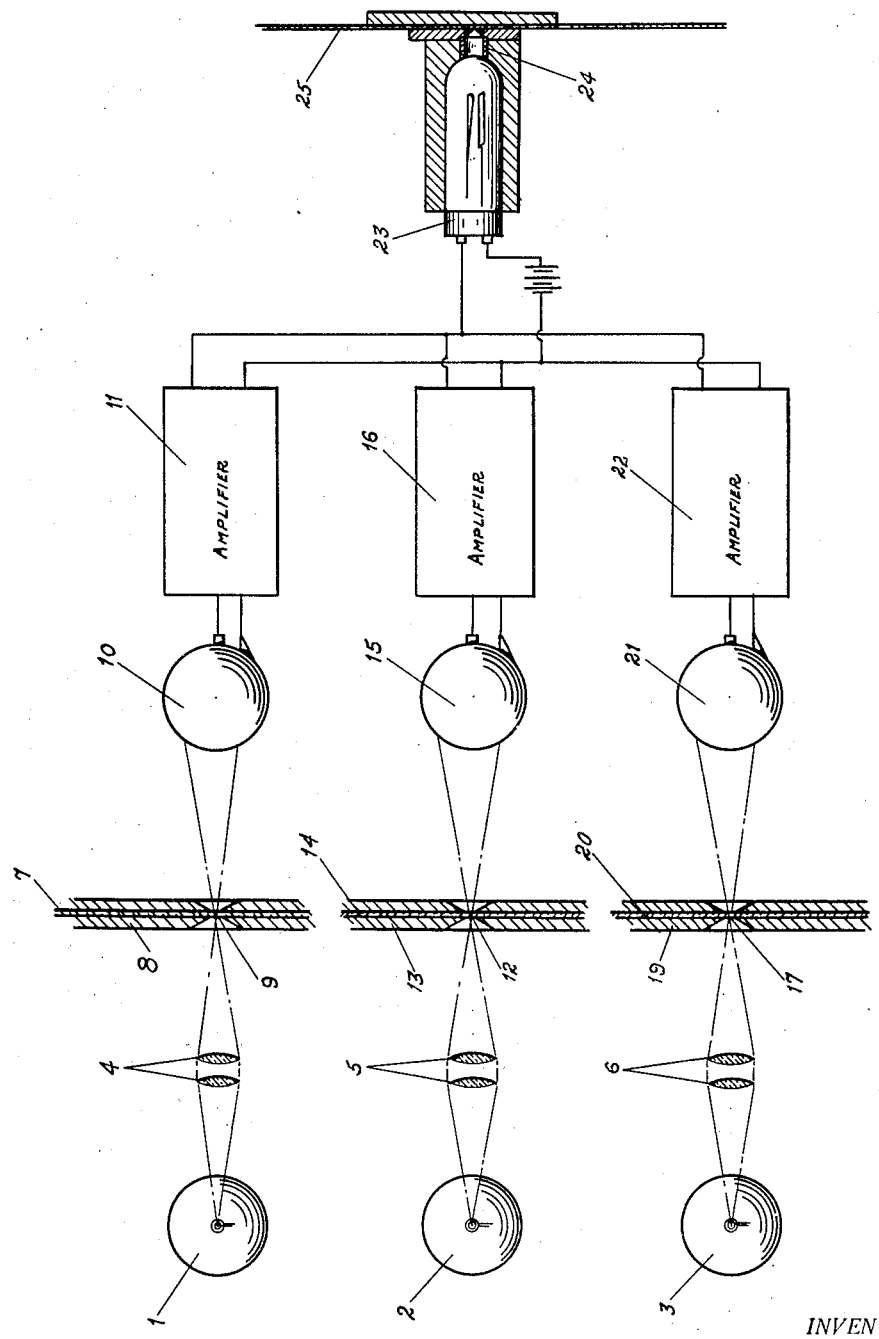
INVENTOR.
FREEMAN H. OWENS.
BY John B. Grady
ATTORNEY Patented Sept. 8, 1931

1,822,057

UNITED STATES PATENT OFFICE

FREEMAN H. OWENS, OF NEW YORK, N. Y.

METHOD FOR RECORDING PHOTOGRAPHIC SOUND RECORDS

Application filed September 17, 1928. Serial No. 306,496.

My invention relates to a method for recording photographic sound records, and has for its primary object the provision of a method for recording in a single record the reproduced sound from a plurality of sound records, the reproduction of such sound records being synchronous.

In the art of recording sound, it is not uncommon that it is desired to make up a composite sound record from a plurality of sound records, such as for instance a song with orchestra accompaniment and with perhaps the addition of some special instrumental feature such as bells or the like. Furthermore, it is often desirable or necessary that the original recording of these various sound records be made separately and at different times and on separate mediums. By recording a composite sound record in accordance with my invention, it is possible to utilize the particular arrangement and kind of apparatus best suited for each sound being recorded originally. Obviously then, with say three separate sound records recorded, and it being desired to combine them all into one composite sound record, my invention provides a means and method for so doing.

I have illustrated my invention in connection with a plurality of photographic sound records, but it will be understood that the scope of my invention includes the use of other kinds of sound records, such as for instance phonograph records.

Many objects and advantages in details will be understood as the description proceeds, reference now being had to the figure of the accompanying drawing forming a part of this application and wherein like reference numerals indicate like parts.

In the drawing:—

The figure is a diagrammatic illustration of my invention which is intended as illustrative only and not limitative.

In carrying out my invention, I provide three independent sources of light of constant intensity, 1, 2 and 3, the light rays from which pass through condensor lenses 4, 5 and 6 respectively to and through the film sound records. The film 7 is adapted to be suitably moved through a film gate 8 provided with a slit opening 9 past which the photographic sound record moves and through which it is adapted to receive the light from the lamp 1. The modulated light rays from the film record are caught by a photoelectric cell 10, and converted in the usual manner into electric impulses suitably amplified with any desired or practical amplifying device indicated at 11.

Likewise, the light rays from the lens 5 are focused upon an opening 12 in a film gate 13 through which moves in any suitable manner, the film strip 14 bearing a photographic sound record. The modulated light rays pass from the film 14 to a photo electric cell 15 wherein such modulated light rays are converted into electric impulses and amplified by any suitable amplifier 16.

Similarly, the light rays from the lens 6 pass through a slit opening 17 in a film gate 19 through which is suitably moved a photographic film 20 bearing a photographic sound record. The modulated light rays from the sound film 20 pass to a photo electric cell 21 and are thus converted into electric impulses and amplified by any suitable amplifier 22. The outputs from the amplifiers 11, 16 and 22 are suitably imposed upon a circuit supplying a current of electricity to a recording lamp 23 whereby the intensity of the light from such lamp is modulated in accordance with the combined amplifier modulations of the outputs from the photo electric cells, which of course are governed by the photographic sound records as above explained. The modulated light from the recording lamp 23 passes through a suitable slit device 24 past which and in engagement with which is suitably moved a photographic film 25 which thus receives and has photographed thereon a single sound record representing the plurality of sound records from the films 7, 14 and 20. Obviously, of course, it will be understood that the sound records on the films 7, 14 and 20 must be synchronized with each other and the movement of such films and of film 25 must be synchronized. This may be accomplished in any known suitable manner as by a common driving means.

In the above described method, it may be assumed for instance that the sound record on the film 7 is that of a vocal number or song. The sound record on the film 14 may be an orchestra accompaniment of the vocal number and which may or may not have been recorded therewith. Likewise, the sound record on the third film 20 may be some special effect such as bells which also may or may not have been recorded with the other sound records. It is sufficient that these three sound records be so arranged that the reproduction thereof will be synchronous for amplification and subsequent recording as a single sound record.

As before stated, it will be understood that my invention contemplates many modifications of this invention to which it is adapted without departing from the spirit and scope thereof. For instance, phonograph records may be substituted for any or all of the photographic records. Also it will be clear that if desired, only one amplifier may be used for all three of the photo electric cells. I do not limit myself, therefore, to the exact form herein shown and described other than by the appended claims.

I claim:—

1. The method of making a composite photographic sound record comprising the steps of synchronously converting a plurality of photographic sound records into electric impulses, combining said impulses, modulating the intensity of a single recording lamp by said combined impulses, and photographing the modulated light rays from said lamp on a sensitized film.

2. The method of making a composite photographic sound record comprising the steps of synchronously converting a plurality of photographic sound records into modulated light rays, converting said rays into electric impulses, amplifying said impulses, modulating the intensity of a single recording lamp by said combined impulses and photographing upon a sensitized film the modulated light rays from said lamp.

3. The method of making a composite photographic sound record comprising the steps of simultaneously converting a plurality of photographic sound records into electric impulses, said impulses amplifying, combining said impulses and photographically recording said combined impulses.

4. In combination, a plurality of means for simultaneously converting a plurality of photographic sound records into electric impulses, means for combining said impulses, and means for making a composite photographic record of all of said impulses.

5. In combination, a plurality of individual means for simultaneously converting a plurality of photographic sound records into individual groups of electric impulses, means for separately amplifying said groups of impulses, means for combining said impulses, and means for photographically recording said combined impulses on a sensitized film.

6. In combination, a plurality of elements, each comprising a source of light, means for modulating said light, and means for converting said modulations into electric impulses; means for combining all of said impulses, and means for making a composite photographic record of said combined impulses.

7. The method of making a composite photographic sound record comprising the steps of converting a plurality of sound records into variations in light, converting said light variations into corresponding electrical impulses, combining said impulses, converting said combined impulses into variations in light and photographically recording said light variations.

8. In combination, a plurality of means for simultaneously converting a plurality of photographic sound records into light variations, a plurality of means for converting said light variations into electric impulses, means for combining said impulses, means for converting said combined impulses into variations in light, and means for recording said last mentioned light variations on a photographic film.

In testimony whereof, I affix my signature.

FREEMAN H. OWENS.

CERTIFICATE OF CORRECTION.

Patent No. 1,822,057.                                                                                        September 8, 1931.

FREEMAN H. OWENS.

It is hereby certified that error appears in the printed specification of the above numbered patent requiring correction as follows: Page 2, line 51, claim 3, strike out the word "amplifying" and insert the same before "said" in same line and claim; and that the said Letters Patent should be read with this correction therein that the same may conform to the record of the case in the Patent Office.

Signed and sealed this 28th day of February, A. D. 1933.

(Seal)                                                      M. J. Moore,
                                                                 Acting Commissioner of Patents.